United States Patent
Kamata et al.

(10) Patent No.: US 11,773,267 B2
(45) Date of Patent: *Oct. 3, 2023

(54) METHOD FOR PRODUCING QUINACRIDONE SOLID SOLUTION PIGMENT, PIGMENT DISPERSION, AND INKJET INK

(71) Applicant: DAINICHISEIKA COLOR & CHEMICALS MFG. CO., LTD., Tokyo (JP)

(72) Inventors: Naoto Kamata, Tokyo (JP); Toshiyuki Hitotsuyanagi, Tokyo (JP); Sachio Yoshikawa, Tokyo (JP); Satoshi Minami, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/745,447

(22) Filed: May 16, 2022

(65) Prior Publication Data

US 2022/0275214 A1    Sep. 1, 2022

Related U.S. Application Data

(62) Division of application No. 16/344,605, filed as application No. PCT/JP2017/036614 on Oct. 10, 2017, now Pat. No. 11,535,755.

(30) Foreign Application Priority Data

Oct. 28, 2016 (JP) ................. 2016-212144

(51) Int. Cl.
| | | |
|---|---|---|
| C09B 48/00 | (2006.01) | |
| C09D 11/322 | (2014.01) | |
| C09B 67/22 | (2006.01) | |
| C09D 17/00 | (2006.01) | |

(52) U.S. Cl.
CPC .......... *C09B 67/0036* (2013.01); *C09B 48/00* (2013.01); *C09D 11/322* (2013.01); *C09D 17/001* (2013.01); *C09D 17/003* (2013.01)

(58) Field of Classification Search
CPC ... C09B 67/0036; C09B 48/00; C09D 11/322; C09D 17/001; C09D 17/003
USPC ........................................ 106/400, 401, 497
See application file for complete search history.

(56) References Cited

U.S. PATENT DOCUMENTS

| | | | |
|---|---|---|---|
| 4,455,173 A | 6/1984 | Jaffe | |
| 4,895,949 A | 1/1990 | Jaffe et al. | |
| 5,318,626 A | 6/1994 | Maki et al. | |
| 5,972,099 A | 10/1999 | Badejo et al. | |
| 5,989,333 A | 11/1999 | Urban et al. | |
| 6,251,553 B1 | 6/2001 | Baur et al. | |
| 6,312,512 B1 | 11/2001 | Urban et al. | |
| 11,535,755 B2* | 12/2022 | Kamata ................ | C09D 7/67 |
| 2013/0050364 A1 | 2/2013 | Imamura et al. | |
| 2020/0062965 A1 | 2/2020 | Kamata et al. | |
| 2020/0407563 A1 | 12/2020 | Kamata et al. | |

FOREIGN PATENT DOCUMENTS

| | | | | |
|---|---|---|---|---|
| CN | 1210123 | 3/1999 | | |
| EP | 0348347 | 12/1989 | | |
| EP | 0896034 | 5/2002 | | |
| JP | 58-023858 | 2/1983 | | |
| JP | 60-035055 | 2/1985 | | |
| JP | 05-125292 | 5/1993 | | |
| JP | 10-030062 | 2/1998 | | |
| JP | 10-219166 | 8/1998 | | |
| JP | 11-049998 | 2/1999 | | |
| JP | 11-100521 | 4/1999 | | |
| JP | H11100521 A | * | 4/1999 | ......... C09B 67/0036 |
| JP | 11-246786 | 9/1999 | | |
| JP | 2000-169745 | 6/2000 | | |

(Continued)

OTHER PUBLICATIONS

International Search Report, issued in the corresponding PCT application No. PCT/JP2017/036614, dated Nov. 14, 2017, 6 pages.

(Continued)

*Primary Examiner* — James E McDonough
(74) *Attorney, Agent, or Firm* — Hamre, Schumann, Mueller & Larson, P.C.

(57) ABSTRACT

There is provided a technique for producing a quinacridone solid solution pigment, the technique making it possible to obtain a quinacridone solid solution pigment which produces a colored product having high chroma and a bluish hue, more preferably which has controlled particle diameters. Specifically, a method for producing a quinacridone solid solution pigment, the method including a crude quinacridone solid solution production step of subjecting a diarylaminoterephthalic acid and a dialkylarylaminoterephthalic acid to a co-cyclization reaction in polyphosphoric acid, thereby obtaining a water-containing crude quinacridone solid solution containing a solid solution of an unsubstituted quinacridone and a 2,9-dialkylquinacridone, the solid solution containing water, a drying step of drying the water-containing crude quinacridone solid solution to reduce the water content to less than 1% and obtain a powdery, crude quinacridone solid solution, and a pigmentation step of heating the powdery, crude quinacridone solid solution in a liquid medium that cannot dissolve the crude quinacridone solid solution.

11 Claims, No Drawings

(56) References Cited

FOREIGN PATENT DOCUMENTS

| JP | 2000-281930 | 10/2000 |
| JP | 2000-319534 | 11/2000 |
| JP | 2002-146224 | 5/2002 |
| JP | 2005-255880 | 9/2005 |
| JP | 2006-096927 | 4/2006 |
| JP | 2007-119774 | 5/2007 |
| JP | 2007119774 A * | 5/2007 |
| WO | 2005/014728 | 2/2005 |
| WO | 2018/079239 | 5/2018 |

OTHER PUBLICATIONS

Australian Examination Report, issued in the corresponding Australian patent application No. 2017350235, dated Oct. 14, 2019, 4 pages.

Japanese Office Action issued in the corresponding Japanese patent application No. 2018-547530, dated Dec. 3, 2019, 6 pages with English translation.

Chinese Office Action issued in the corresponding Chinese patent application No. 201780066181.X, dated Mar. 2, 2020, 8 pages.

Extended European Search report, issued in the corresponding European Patent Application No. 17864504.0, dated Jun. 12, 2020, 7 pages.

First Canadian Office Action, issued in the corresponding Canadian patent application No. 3041601, dated Jun. 16, 2020, 4 pages.

Korean Office Action, issued in the corresponding Korean patent application No. 10-2019-7014794, dated Aug. 21, 2020, 9 pages (including machine translation).

International Search Report, issued in the PCT application No. PCT/JP2018/013788, dated Jun. 5, 2018, 5 pages.

Australian Office Action, issued in the Australian patent application No. 2018416405, dated Dec. 1, 2020, 4 pages.

International Preliminary Report on Patentability, issued in the corresponding PCT application No. PCT/JP2018/013788, dated Oct. 6, 2020, 7 pages.

European Partial Search Report, issued in the European application No. 18912892.9, dated Dec. 2, 2021, 14 pages.

Restriction Requirement, issued in the related U.S. Appl. No. 16/976,169, dated May 26, 2023, 7 pages.

* cited by examiner

METHOD FOR PRODUCING QUINACRIDONE SOLID SOLUTION PIGMENT, PIGMENT DISPERSION, AND INKJET INK

TECHNICAL FIELD

The present invention relates to a method for producing a quinacridone solid solution pigment, a pigment dispersion liquid, and an inkjet ink. In detail, the present invention relates to: a method for producing a quinacridone solid solution, the method making it possible to obtain a quinacridone solid solution pigment which produces a colored product having high chroma and a bluish hue, the colored product obtained by applying the method, more preferably which has controlled particle diameters in such an extent that the quinacridone solid solution pigment can be applied to an inkjet ink; a pigment dispersion liquid and an inkjet ink each containing a particular quinacridone solid solution pigment that can be obtained by the production method.

BACKGROUND ART

A lot of studies on a quinacridone solid solution pigment have been conducted in an organic pigment field, and, for example, a quinacridone pigment composed of a solid solution of an unsubstituted quinacridone and 2,9-dimethylquinacridone, C.I. Pigment Red 206 which is a quinacridone pigment composed of an unsubstituted quinacridone and a quinacridone quinone, C.I. Pigment Red 207 which is a quinacridone pigment composed of a solid solution of an unsubstituted quinacridone and 4,11-dichloroquinacridone, etc. are known (see Patent Literatures 1 and 2).

CITATION LIST

Patent Literature

Patent Literature 1: Japanese Patent Laid-Open No. 2000-281930
Patent Literature 2: Japanese Patent Laid-Open No. 2002-146224

SUMMARY OF INVENTION

Technical Problem

However, there has been a problem that the chroma of colored products obtained from conventional quinacridone solid solution pigments is still insufficient. In addition, a quinacridone solid solution having a bluish hue has been desired in the market in recent years, but a quinacridone solid solution which can fully satisfy this need in the market, the quinacridone solid solution having high chroma and a bluish hue, has not existed yet. In addition, for example, a pigment for use as a colorant in an inkjet ink is required to be fine and have uniform particle diameters; however, there is a problem that it is difficult to control the size of the diameter of fine particles in solid solution pigments.

Accordingly, an object of the present invention is to provide a technique by which a quinacridone solid solution pigment which forms a colored product having high chroma and a bluish hue, and, more preferably, a quinacridone solid solution pigment having controlled particle diameters and having desired particle diameters can be produced. In addition, another object of the present invention is to provide a pigment dispersion liquid and an inkjet ink each enabling formation of a colored product having high chroma and a bluish hue by developing a technique that can provide an excellent quinacridone solid solution pigment, as described above, which is suitable, for example, as a colorant for an inkjet ink.

Solution to Problem

The above-described problems of the conventional techniques are solved by the present invention described below. That is, the present invention provides

[1] A method for producing a quinacridone solid solution pigment, the method including: a crude quinacridone solid solution production step; a drying step of drying the crude quinacridone solid solution; and a pigmentation step of heating the dried crude quinacridone solid solution in a solvent, thereby making the dried crude quinacridone solid solution into a pigment, wherein: in the crude quinacridone solid solution production step, a diarylaminoterephthalic acid and a dialkylarylaminoterephthalic acid are subjected to a co-cyclization reaction in polyphosphoric acid to obtain a water-containing crude quinacridone solid solution containing a solid solution of an unsubstituted quinacridone and a 2,9-dialkylquinacridone, the solid solution containing water; in the drying step, the water-containing crude quinacridone solid solution obtained in the solid solution production step is dried to reduce a water content to less than 1% and obtain a powdery, crude quinacridone solid solution; and in the pigmentation step, the powdery, crude quinacridone solid solution is heated in a liquid medium that cannot dissolve the crude quinacridone solid solution.

Preferred embodiments of the above-described method for producing a quinacridone solid solution pigment according to the present invention include the following embodiments.

[2] The method for producing a quinacridone solid solution pigment according to [1], wherein the diarylaminoterephthalic acid is 2,5-dianilinoterephthalic acid, and the dialkylarylaminoterephthalic acid is 2,5-di(p-toluidino) terephthalic acid.

[3] The method for producing a quinacridone solid solution pigment according to [1] or [2], wherein a mass ratio of the unsubstituted quinacridone to the 2,9-dialkylquinacridone is 20:80 to 40:60.

[4] The method for producing a quinacridone solid solution pigment according to any one of [1] to [3], wherein in the pigmentation step, a quinacridone-based pigment derivative is allowed to exist in heating the powdery, crude quinacridone solid solution in the liquid medium.

[5] The method for producing a quinacridone solid solution pigment according to [4], wherein the quinacridone-based pigment derivative is 2-phthalimidemethylquinacridone.

[6] The method for producing a quinacridone solid solution pigment according to any one of [1] to [5], wherein the liquid medium that cannot dissolve the crude quinacridone solid solution is dimethyl sulfoxide or 1,3-dimethyl-2-imidazolidinone.

[7] The method for producing a quinacridone solid solution pigment according to [6], wherein a heating temperature in the pigmentation step is 60° C. or higher and 120° C. or lower.

[8] The method for producing a quinacridone solid solution pigment according to any one of [1] to [7], wherein the method is for obtaining a quinacridone solid solution pigment having major axis diameters of particles of 30 to 100 nm.

The present invention provides as other embodiments a pigment dispersion liquid and an inkjet ink described below.

[9] A pigment dispersion liquid containing: a quinacridone solid solution pigment of an unsubstituted quinacridone and a 2,9-dialkylquinacridone; a pigment dispersant; and water, wherein the quinacridone solid solution pigment has peaks at Bragg angles (2θ±0.2°) of 27.3°, 13.9°, and 5.6° in powder X-ray diffraction.

[10] An inkjet ink containing: a quinacridone solid solution pigment comprising a solid solution of an unsubstituted quinacridone and a 2,9-dialkylquinacridone, having major axis diameters of particles of 30 to 100 nm; a piment dispersant; and water, wherein the quinacridone solid solution pigment has peaks at Bragg angles (2θ±0.2°) of 27.3°, 13.9°, and 5.6° in powder X-ray diffraction.

Advantageous Effects of Invention

According to the present invention, a quinacridone solid solution pigment which produces a colored product having high chroma and a bluish hue is provided, and it becomes possible to provide a quinacridone solid solution pigment the particle diameters of which are controlled into appropriate sizes, which further becomes an important effect in addition to the above-described effect in practical use. In addition, according to the present invention, it becomes possible to provide a pigment dispersion liquid and an inkjet ink which can provide a colored product having high chroma and a bluish hue by applying the above-described excellent quinacridone solid solution pigment.

DESCRIPTION OF EMBODIMENTS

Next, the present invention will be described in more detail giving preferred embodiments for carrying out the present invention. The present inventors have conducted diligent studies in order to solve the previously described problems in the conventional techniques and have reached the present invention. That is, in a conventional method for producing a quinacridone solid solution pigment, a diarylaminoterephthalic acid and a dialkylarylaminoterephthalic acid are subjected to a co-cyclization reaction in polyphosphoric acid to produce a water-containing crude quinacridone solid solution containing an unsubstituted quinacridone and a 2,9-dialkylquinacridone, and the obtained crude quinacridone solid solution is then heated in a solvent keeping the water-containing state to be made into a pigment, but on the other hand, the present inventors have completed the present invention by finding that by newly providing, prior to the pigmentation step, a drying step of reducing the water content to less than 1% to make a powdery, crude quinacridone solid solution, a colored product formed with the obtained quinacridone solid solution pigment has higher chroma and a bluisher hue than colored products obtained by using conventional solid solution pigments. In addition, according to the production method of the present invention, it becomes possible to control the particle diameters of the quinacridone solid solution pigment to be obtained to desired sizes, and particularly, it becomes possible to obtain a quinacridone solid solution pigment having particle diameters suitable for an inkjet ink for which the ejection stability of the ink is desired.

<Method for Producing Quinacridone Solid Solution Pigment>

A method for producing a quinacridone solid solution pigment according to the present invention is characterized in that the method includes: a crude quinacridone solid solution production step; a drying step of drying the crude quinacridone solid solution; and a pigmentation step of heating a dried, powdery, crude quinacridone solid solution in a solvent, thereby making the dried, powdery, crude quinacridone solid solution into a pigment, and particularly, the drying step of drying a water-containing crude quinacridone solid solution is newly provided. Specifically, the method for producing a quinacridone solid solution pigment is characterized in that in the crude quinacridone solid solution production step, a water-containing crude quinacridone solid solution is obtained in the same manner as in conventional methods for producing a crude quinacridone solid solution, the water-containing crude quinacridone solid solution obtained above is dried in the next drying step to reduce the water content to less than 1% and obtain a powdery, crude quinacridone solid solution, and the obtained powdery, crude quinacridone solid solution is thereafter heated in a liquid medium that cannot dissolve the crude quinacridone solid solution, thereby making the obtained powdery, crude quinacridone solid solution into a pigment.

Further, according to studies conducted by the present inventors, by using dimethyl sulfoxide or 1,3-dimethyl-2-imidazolidione as a liquid medium in making a pigment, it becomes possible to control the particle diameters of the quinacridone solid solution pigment to be obtained to appropriate sizes. Particularly, when the heating temperature is set so as to fall within a range of 60° C. or higher and 120° C. or lower in making a pigment by performing heating in these liquid media, it becomes thereby possible to control the particle diameters of the quinacridone solid solution pigment to be obtained stably to sizes suitable for the use.

In addition, according to studies conducted by the present inventors, when a quinacridone-based pigment derivative is allowed to exist in making a pigment by heating the powdery, crude quinacridone solid solution in the liquid medium, an effect of making the particles of the quinacridone solid solution pigment uniform and an effect of making the chroma of a colored product high can be thereby further enhanced.

The "quinacridone solid solution pigment" herein refers to a pigment in which a plurality of different quinacridone pigment molecules exist in a mixed state of being dissolved in one another and in a uniform solid phase state, and does not mean a mixture obtained by simply mixing a plurality of different quinacridone pigments. It is known that the properties such as color are changed by producing a solid solution. The present invention intends to produce a solid solution of an unsubstituted quinacridone and a 2,9-dialkylquinacridone, and as a single pigment, the unsubstituted quinacridone corresponds to C.I. Pigment Violet 19, and the 2,9-dialkylquinacridone corresponds to C.I. Pigment Red 122. Hereinafter, each step in the production method according to the present invention will be described.

(Crude Quinacridone Solid Solution Production Step)

In the production method according to the present invention, a diarylaminoterephthalic acid and a dialkylarylaminoterephthalic acid are first subjected to a co-cyclization reaction in polyphosphoric acid to obtain a water-containing crude quinacridone solid solution containing an unsubstituted quinacridone, a 2,9-dialkylquinacridone, and water. Through the above-described co-cyclization reaction of the diarylaminoterephthalic acid and the dialkylarylaminoterephthalic acid, the water-containing crude quinacridone solid solution containing water is obtained. This step is the same as a conventional method for obtaining a quinacridone-based solid solution pigment. In the conventional production method, the crude quinacridone solid solution is made into a pigment keeping this water-containing state.

As the diarylaminoterephthalic acid for use in the above-described step, for example, 2,5-dianilinoterephthalic acid is preferable. In addition, as the dialkylarylaminoterephthalic acid, for example, 2,5-di(p-toluidino) terephthalic acid is preferable. To more stably obtain the quinacridone solid solution pigment which is the final object in the present invention and which produces a colored product having high chroma and a bluish hue, it is preferable to use these compounds.

According to studies conducted by the present inventors, to obtain the quinacridone solid solution pigment which is demanded in the market and which produces a colored product having high chroma and a bluish hue, it is preferable to perform design in such a way that the mass ratio of the unsubstituted quinacridone to the 2,9-dialkylquinacridone, which are obtained by the above-described co-cyclization reaction, is 20:80 to 40:60.

(Drying Step)

The production method according to the present invention is different from the conventional methods for producing a quinacridone solid solution pigment, and it is required in the drying step, which is newly provided, that the water-containing crude quinacridone solid solution obtained in the crude quinacridone solid solution production step be dried to obtain a powdery, crude quinacridone solid solution having a water content of less than 1%, and thereafter the powdery, crude quinacridone solid solution be made into a pigment. According to studies conducted by the present inventors, by providing the drying step specified in the present invention, it becomes possible to obtain the quinacridone solid solution pigment which produces a colored product having high chroma and a bluish hue. That is, an important thing in the present invention is that the water-containing crude quinacridone solid solution is dried sufficiently to be made into a powdery, crude quinacridone solid solution having a water content of less than 1%, and the powdery, crude quinacridone solid solution is thereafter made into a pigment. The technical characteristic of the present invention is in that stably obtaining the quinacridone solid solution pigment with which a colored product having high chroma and a bluish hue is obtained is realized by newly providing the above-described drying step.

In contrast, even if the water-containing crude quinacridone solid solution is dried, unless the water-containing crude quinacridone solid solution is dried completely, specifically when the water content is 1% or larger, the hue of a colored product formed with a finally obtained quinacridone solid solution pigment becomes yellowish, and therefore a colored product that satisfies the bluish hue which has been required in the market in recent years is not obtained.

(Pigmentation Step)

In the production method according to the present invention, the powdery, crude quinacridone solid solution obtained in the previously described drying step is heated in a liquid medium that cannot dissolve the crude quinacridone solid solution in the subsequent pigmentation step to obtain a quinacridone solid solution pigment. Basically, the pigmentation step may be the same as a pigmentation method performed in the conventional methods.

Examples of the liquid medium that cannot dissolve the crude quinacridone solid solution for use in making a pigment include dimethylformamide, dimethyl sulfoxide, N-methylpyrrolidone, ethanol, propanol, butanol, and ethylene glycol. It is described in Patent Literature 2 given previously as a conventional technique that dimethylformamide and butanol are preferable among the above-described liquid media. In addition, it is also described that as the heating temperature, an arbitrary temperature from 25 to 140° C. can be adopted.

On the other hand, the present inventors have conducted diligent studies on this pigmentation step to find that the particle diameters of the quinacridone solid solution pigment to be obtained are controlled to appropriate sizes corresponding to the use by devising the type of the liquid medium to be used as described previously and further, by devising the temperature at which heating is performed in the liquid medium.

Specifically, the present inventors have found that the particle diameters of the quinacridone solid solution pigment to be obtained can be controlled into appropriate sizes by heating the powder of the crude quinacridone solid solution in a solvent of dimethyl sulfoxide or 1,3-dimethyl-2-imidazolidinone in the pigmentation step performed after obtaining the powdery, crude quinacridone solid solution having a water content of less than 1% in the drying step of drying the water-containing crude quinacridone solid solution, the drying step newly provided in the production method according to the present invention. The present inventors have further found that by setting the heating temperature on that occasion to within a particular temperature range of 60° C. or higher and 120° C. or lower, the particle diameters of the quinacridone solid solution pigment to be obtained can be more stably controlled to the sizes suitable for the use. For example, in the case where the quinacridone solid solution pigment for use in an inkjet ink is obtained, when the heating temperature exceeds 120° C., the particle diameters of the quinacridone solid solution pigment become too large, and on the other hand, when the heating temperature is lower than 60° C., the particle diameters of the quinacridone solid solution pigment become too small, and therefore it becomes difficult to disperse the quinacridone solid solution pigment favorably in an aqueous medium.

According to studies conducted by the present inventors, the above-described effect is particularly remarkable in the case where dimethyl sulfoxide or 1,3-dimethyl-2-imidazolidinone is used as the solvent for use in the pigmentation step, and, for example, a similar effect cannot be obtained with alcohol-based solvents, such as butanol, which are described as preferable in Patent Literature 2 given previously as a conventional technique.

In addition, according to studies conducted by the present inventors, when a quinacridone-based pigment derivative is added and a pigment is made in a state where the quinacridone-based pigment derivative is allowed to exist in heating the powdery, crude quinacridone solid solution in dimethyl sulfoxide or 1,3-dimethyl-2-imidazolidinone, an effect of making the particles of the quinacridone solid solution pigment to be obtained and an effect of making the chroma of the quinacridone solid solution pigment to be obtained high are thereby further enhanced. As the quinacridone-based pigment derivative for use on this occasion, 2-phthalimidemethylquinacridone is preferable.

<Quinacridone Solid Solution Pigment>

As described previously, the quinacridone solid solution pigment obtained by the method according to the present invention contains an unsubstituted quinacridone and a 2,9-dialkylquinacridone as essential components and forms a mixed phase in which the 2,9-dialkylquinacridone is regarded as dissolving into a crystal phase of the unsubstituted quinacridone. Therefore, the quinacridone solid solution pigment obtained by the method according to the present invention has peaks at particular Bragg angles by powder X-ray diffraction, the peaks not existing in an unsubstituted quinacridone single crystal and a 2,9-dialkylquinacridone single crystal. Accordingly, the solid solution or the mixture of respective single crystals can be easily decided by the powder X-ray diffraction.

The quinacridone solid solution pigment which is obtained by the production method according to the present invention and which can provide a colored product having high chroma and a bluish hue is characterized by having peaks at Bragg angles (2θ±0.2°) of 27.3°, 13.9°, and 5.6° in the powder X-ray diffraction. In addition, the relative intensity ratios of the peaks are about 60 to about 70 for the peak at 13.9° and about 70 to about 80 for the peak at 27.3° when the intensity of the peak at 5.6° is assumed to be 100.

The particle diameters of the quinacridone solid solution pigment obtained by the production method according to the present invention are not particularly limited. As the quinacridone solid solution pigment for use in an inkjet ink according to the present invention, the major axis diameters of particles are required to be 30 to 100 nm when the ejection stability of the inkjet ink is taken into consideration, and further, it is preferable that the major axis diameters of particles be about 50 nm.

<Inkjet Ink>

An inkjet ink according to the present invention contains a quinacridone solid solution pigment having major axis diameters of particles of 30 to 100 nm, the quinacridone solid solution pigment obtained by the production method according to the present invention described previously. Further, the inkjet ink according to the present invention is required to contain a pigment dispersant in order to improve the dispersibility and dispersion stability of the quinacridone solid solution pigment and the storage stability of the ink with time. As the pigment dispersant, those which have been used in conventionally known aqueous inkjet pigment inks can be appropriately used. Besides, if necessary, additives such as a surfactant, an organic solvent, and a humectant may be added to the inkjet ink according to the present invention, and known techniques on aqueous inkjet pigment inks can also be applied to these additives.

The inkjet ink according to the present invention is characterized by containing a quinacridone solid solution pigment which is obtained by the production method according to the present invention and which produces a colored product having high chroma and a bluish hue; however, the amount of addition of the quinacridone solid solution pigment is not particularly limited and may be added in a conventionally known range. Specifically, the amount of addition of the quinacridone solid solution pigment is 0.5 to 30% by mass and preferably about 4 to about 10% by mass in 100% by mass of the ink. When the amount of addition is less than 0.5% by mass, the print density cannot be secured in some cases, and on the other hand, when the amount of addition exceeds 30% by mass, a viscosity increase occurs in the ink and structural viscosity occurs in viscosity properties, so that the ejection stability of the ink from an inkjet head may be deteriorated in some cases.

EXAMPLES

Hereinafter, the present invention will be further described giving Examples and Comparative Examples. It is to be noted that "%" and "parts" described below are each on a mass basis unless otherwise noticed.

Example 1

Into a 100-ml separable flask, 65.6 g of 85% phosphoric acid was weighed and placed, and 9.87 g of phosphoric anhydride was added to prepare 84.0% polyphosphoric acid. When the internal temperature was lowered to about 100° C., 14.28 g of 2,5-di(p-toluidino) terephthalic acid (DM-DATA) and, subsequently, 6.12 g of 2,5-dianilinoterephthalic acid (DATA) were added gradually. After the addition was completed, a condensation reaction was performed at 120° C. for 4 hours. After the reaction was completed, the reaction liquid was put into a 1-L beaker with 400 ml of normal temperature water filled therein. After filtration and washing with water were performed, the resultant liquid was transferred to a 1-L beaker, 800 ml of water was added, a resultant mixture was stirred, and caustic soda was added to adjust the pH to 7 to 8. A resultant mixture was subjected to filtration and washing with hot water to obtain a water-containing crude quinacridone solid solution.

The water-containing crude quinacridone solid solution obtained above was dried at 80° C. overnight to reduce the water content to less than 1%. After the drying was completed, the quinacridone solid solution was pulverized to obtain 18.0 g of a powder of the crude quinacridone solid solution. The obtained powder was observed with a transmission electron microscope to find that the average major axis diameter of particles was about 20 nm.

Next, dimethyl sulfoxide was used as a liquid medium that cannot dissolve the above-described powder to make the crude quinacridone solid solution into a pigment. Specifically, 7.0 g of the powder of the crude quinacridone solid solution obtained above and 70.0 g of dimethyl sulfoxide were loaded in a 100-mL separable flask, the temperature was raised to 105° C. over 1 hour to perform a heating treatment at a temperature of 105° C. for 6 hours. After the treated mixture was cooled to 70° C. or lower, the treated mixture was subjected to filtration, and washed with hot water and with water until the filtrate became colorless, and a residue was then dried at 80° C. to obtain a powder of a quinacridone solid solution pigment of the present Example.

Whether the pigment obtained above is a quinacridone solid solution which is an object of the present invention was checked by powder X-ray diffraction.

Specifically, the powder of the quinacridone solid solution pigment to be measured was filled in a predetermined holder, and measurement was conducted using miniFlex600 (trade name, manufactured by Rigaku Corporation, the same apparatus was used in other examples), which is a powder X-ray diffraction apparatus. The results were such that the quinacridone solid solution pigment obtained above had peaks at Bragg angles (2θ±0.2°) of 27.3°, 13.9°, and 5.6° in the powder X-ray diffraction, and the intensity ratios of the peaks were such that the intensity of the peak at 13.9° was 65, and the intensity of the peak at 27.3° was 75 when the intensity of the peak at 5.6° was assumed to be 100.

In addition, the pigment particles of the quinacridone solid solution pigment obtained above were observed with a transmission electron microscope to find that the average major axis diameter of the particles was about 50 nm. This is denoted as a quinacridone solid solution pigment 1. Evaluation results of the color of a colored product obtained using the quinacridone solid solution pigment 1 obtained above will be described together with those of the other examples.

Example 2

In the present Example, the powdery, crude quinacridone solid solution obtained in Example 1 was used and made into a pigment by being heated further in the presence of a quinacridone-based pigment derivative. Specifically, 7.0 g of the powder of the crude quinacridone solid solution obtained in Example 1, 70.0 g of dimethyl sulfoxide as a liquid medium, and 0.35 g of a 2-phthalimidemethylquinacridone powder being a quinacridone-based pigment derivative were loaded in a 100-mL separable flask, and the temperature was raised to 105° C. over 1 hour to perform a treatment at a temperature of 105° C. for 6 hours. After the treated mixture was cooled to 70° C. or lower, the treated mixture was subjected to filtration, and washed with hot water and with water until the filtrate became colorless, and a residue was then dried at 80° C. to obtain a powder of a quinacridone solid solution pigment of the present Example.

Whether the pigment obtained above is a quinacridone solid solution which is an object of the present invention was checked by powder X-ray diffraction. Specifically, the pigment obtained above had peaks at Bragg angles (2θ±0.2°) of 27.3°, 13.9°, and 5.6° in the powder X-ray diffraction, and the intensity ratios of the peaks were such that the intensity of the peak at 13.9° was 65, and the intensity of the peak at 27.3° was 70 when the intensity of the peak at 5.6° was assumed to be 100, and thus it was ascertained that the pigment obtained above is a quinacridone solid solution which is an object of the present invention. In addition, the pigment particles were observed with a transmission electron microscope in the same manner as in Example 1 to find that the average major axis diameter of the particles was about 40 nm. This is denoted as a quinacridone solid solution pigment 2.

Example 3

In the present Example, the powdery, crude quinacridone solid solution obtained in Example 1 was used and made into a pigment using a liquid medium different from the liquid medium in Example 1. Specifically, 7.0 g of the powder of the crude quinacridone solid solution obtained in Example 1, 70.0 g of 1,3-dimethyl-2-imidazolidinone as a liquid medium were loaded in a 100-mL separable flask, and the temperature was raised to 105° C. over 1 hour to perform a treatment at a temperature of 105° C. for 6 hours. After the treated mixture was cooled to 70° C. or lower, the treated mixture was subjected to filtration, and washed with hot water and with water until the filtrate became colorless, and a residue was then dried at 80° C. to obtain a powder of a quinacridone solid solution pigment of the present Example.

The pigment obtained above had peaks at Bragg angles (2θ±0.2°) of 27.3°, 13.9°, and 5.6° in the powder X-ray diffraction, and the intensity ratios of the peaks were such that the intensity of the peak at 13.9° was 65, and the intensity of the peak at 27.3° was 75 when the intensity of the peak at 5.6° was assumed to be 100, and thus it was ascertained that the pigment obtained above is a quinacridone solid solution which is an object of the present invention.

In addition, the pigment particles were observed with a transmission electron microscope in the same manner as in Example 1 to find that the average major axis diameter of the particles was about 70 nm. This is denoted as a quinacridone solid solution pigment 3. As described previously, since the particle diameter of the quinacridone solid solution pigment 1 was about 50 nm, the above-described results show that the particle diameter of a solid solution pigment to be obtained can be changed by changing the type of the liquid medium for use in pigmentation.

Examples 4-1 to 4-5

In the present Examples, the powdery, crude quinacridone solid solution obtained in Example 1 was used and made into pigments using dimethyl sulfoxide as a liquid medium for use in pigmentation and changing the heating temperature of 105° C. to 50° C., 60° C., 80° C., 120° C., and 130° C., and thus 5 types of quinacridone solid solution pigments were obtained. As a result, as shown in Table 1, it was ascertained that the particle diameter of a quinacridone solid solution pigment to be obtained changes according to the heating temperature. When this point is utilized, a quinacridone solid solution pigment having a desired particle diameter according to the use thereof can be obtained. In Table 1, the result of Example 1 where heating was performed at 105° C. is shown together.

TABLE 1

Difference in particle diameter among solid solutions obtained in Examples 4-1 to 4-5 and Example 1

| | Example 4-1 | Example 4-2 | Example 4-3 | Example 1 | Example 4-4 | Example 4-5 |
|---|---|---|---|---|---|---|
| Heating temperature (° C.) | 50 | 60 | 80 | 105 | 120 | 130 |
| Major axis diameter of particles (nm) | about 20 | about 30 | about 40 | about 50 | about 100 | about 120 |

Examples 5-1 and 5-2

In the present Examples, quinacridone solid solution pigments were each obtained using the powdery, crude quinacridone solid solution obtained in Example 1 in the same manner as in Example 1 except that the liquid medium for use in pigmentation was changed to each liquid medium shown in Table 2 in place of dimethyl sulfoxide used in Example 1. The particle diameters of the obtained quinacridone solid solution pigments are shown in Table 2. As a result, it was ascertained that the obtained quinacridone solid solution pigments are unsuitable for the application to an inkjet ink because the particle diameters of the obtained quinacridone solid solution pigments became smaller than in the case of Example 1 as shown in Table 2.

TABLE 2

Difference in particle diameter among solid solutions
obtained in Examples 5-1 and 5-2 and Example 1

|  | Example 5-1 | Example 5-2 | Example 1 |
|---|---|---|---|
| Type of liquid medium | Iso-butanol | Diethylene glycol | Dimethyl sulfoxide |
| Major axis diameter of particles (nm) | about 20 | about 25 | about 50 |

Comparative Example 1

In the present Comparative Example, the water-containing crude quinacridone solid solution obtained in Example 1 was made into a pigment as described below keeping the water-containing state without being dried and being made into a powder in the same manner as in the conventional techniques. In addition, methanol was used as the liquid medium for use in pigmentation. Specifically, in a 300-mL container which can be pressurized, 47.8 g (solid content: 7.0 g) of wet cake being a water-containing crude quinacridone solid solution and 95.2 g of methanol were loaded and stirred sufficiently, and a small amount of caustic soda was then added to adjust the pH to around 12. Subsequently, the temperature was raised to 105° C. over 0.5 hours, and heating and stirring were performed at a temperature of 105° C. for 6 hours. The internal pressure during the heating and stirring was 0.2 MPa at the maximum. The content was left standing to be cooled until the temperature of the content reached room temperature, the content was then subjected to filtration and washed with hot water until the filtrate became colorless, and a residue was then dried at 80° C. to obtain a quinacridone solid solution pigment of the present Comparative Example.

Whether the pigment obtained above is a quinacridone solid solution was checked by powder X-ray diffraction in the same manner as in Examples. Specifically, the obtained quinacridone solid solution pigment had peaks at Bragg angles (2θ±0.2°) of 27.3°, 13.9°, and 5.6° in the powder X-ray diffraction. However, the intensity ratios of the peaks were such that the intensity of the peak at 13.9° was 50, and the intensity of the peak at 27.3° was 56 when the intensity of the peak at 5.6° was assumed to be 100, and therefore the intensity ratios of the peaks were different from those in Examples. In addition, the pigment particles were observed with a transmission electron microscope to find that the average major axis diameter of the particles was about 140 nm. This is denoted as a comparative quinacridone solid solution pigment 1.

Comparative Example 2

The water-containing crude quinacridone solid solution obtained in Example 1 was made into a pigment keeping the water-containing state without being dried and being made into a powder in the same manner as in Comparative Example 1. In the present Comparative Example, dimethyl sulfoxide was used in the same manner as in Example 1 as the liquid medium for use in pigmentation. Specifically, in a 300-mL container which can be pressurized, 47.8 g (solid content: 7.0 g) of wet cake being a water-containing crude quinacridone solid solution and 95.2 g of dimethyl sulfoxide were loaded and stirred sufficiently. Subsequently, the temperature was raised to 130° C. over 0.5 hours, and heating and stirring were performed at a temperature of 130° C. for 6 hours. The internal pressure during the heating and stirring was 0.05 MPa at the maximum. The content was left standing to be cooled until the temperature of the content reached room temperature, the content was then subjected to filtration and washed with hot water until the filtrate became colorless, and a residue was then dried at 80° C. to obtain a quinacridone solid solution pigment of the present Comparative Example.

Whether the pigment obtained above is a quinacridone solid solution was checked by powder X-ray diffraction in the same manner as in Examples. The obtained quinacridone solid solution pigment had peaks at Bragg angles (2θ±0.2°) of 27.3°, 13.9°, and 5.6° in the powder X-ray diffraction. However, the intensity ratios of the peaks were such that the intensity of the peak at 13.9° was 50, and the intensity of the peak at 27.3° was 54 when the intensity of the peak at 5.6° was assumed to be 100, and therefore the intensity ratios of the peaks were different from those in Examples. In addition, the pigment particles were observed with a transmission electron microscope to find that the average major axis diameter of the particles was about 200 nm. This is denoted as a comparative quinacridone solid solution pigment 2.

Comparative Example 3

A quinacridone solid solution pigment of the present Comparative Example was obtained in the same manner as in Comparative Example 1 except that a crude quinacridone solid solution having a water content of 5%, the crude quinacridone solid solution obtained by drying the water-containing crude quinacridone solid solution obtained in Example 1 at 80° C. for 6 hours, was used. Whether the pigment obtained above is a quinacridone solid solution was checked by powder X-ray diffraction in the same manner as in Examples. The obtained quinacridone solid solution pigment had peaks at Bragg angles (2θ±0.2°) of 27.3°, 13.9°, and 5.6° in the powder X-ray diffraction. However, the intensity ratios of the peaks were such that the intensity of the peak at 13.9° was 59, and the intensity of the peak at 27.3° was 68 when the intensity of the peak at 5.6° was assumed to be 100, and therefore the intensity ratios of the peaks were different from those in Examples. In addition, the pigment particles were observed with a transmission electron microscope to find that the average major axis diameter of the particles was about 50 nm. This is denoted as a comparative quinacridone solid solution pigment 3.

<Evaluation>

An original color paint film and a light color paint film were each prepared with a paint using the quinacridone solid solution pigment obtained in each of Examples 1 to 3 and Comparative Examples 1 to 3, and L*a*b* values thereof were measured and evaluated. The results are shown in Table 3.

(Preparation of Paints)

1. Preparation of Base Paint

In a plastic container, 0.8 g of the pigment of each of Examples and Comparative Examples, 5.0 g of an alkyd-melamine resin [106-3700 Lacquer Clear Art Clear (trade name); manufactured by Isamu Paint Co., Ltd.], 5.0 g of a thinner [Nippe 2500 Thinner (trade name); manufactured by NIPPONPAINT Co., Ltd.], which contains toluene, ethyl acetate, and butanol as the main components, and 50.0 g of a glass bead were loaded. This mixture was dispersed with a paint shaker for 1 hour, 35.0 g of the above-described alkyd-melamine resin and 4.0 g of the above-described thinner were then added, and a resultant mixture was dispersed for 10 minutes. In a plastic container, 10.0 g of the dispersion liquid and 20.0 g of the above-described alkyd-melamine resin were loaded, and a resultant mixture was dispersed and mixed with MAZERUSTAR to make a base paint.

2. Preparation of Light Color Paint

In a plastic container, 0.8 g of the pigment of each of Examples and Comparative Examples, 5.0 g of the previously described alkyd-melamine resin, 5.0 g of the previously described thinner, and 50 g of a glass bead were loaded. This mixture was dispersed with a paint shaker for 1 hour, 35.0 g of the previously described alkyd-melamine resin and 4.0 g of the previously described thinner were added, and a resultant mixture was dispersed for 10 minutes. In a plastic container, 10.0 g of the dispersion liquid thus obtained and 20.0 g of a white ink [10 Super 300 White (trade name); manufactured by NIPPONPAINT Co., Ltd.], which contains titanium oxide as the main component, were loaded, and a resultant mixture was dispersed with MAZERUSTAR to make a light color paint.

3. Preparation of Colored Products and Evaluation of Hue (1) Each base paint previously described was applied on white paper using a 6-mil applicator. This white paper was dried at room temperature for several hours. Comparative evaluation of the hue was conducted by visual observation and with a colorimeter with respect to each piece of colored paper (hereinafter, referred to as original color paint film) of Examples and Comparative Examples thus prepared. The results are shown in Table 3. It is to be noted that the visual observation is relative evaluation.

(2) Each light color paint was applied on white paper using a 6-mil applicator. This white paper was dried at room temperature for several hours. Evaluation of the hue was also conducted with respect to each colored product (hereinafter, referred to as light color paint film) thus prepared in the same manner as described above.

The colorimetric values of Examples 1 to 3 and Comparative Examples 1 to 3 are shown in Table 3. CM-3600d (trade name), which is a spectrophotometer manufactured by Konica Minolta, Inc., was used for the colorimetric measurement. $L^*$ represents brightness and $C^*$ represents chroma, and the chroma $C^*$ was determined by $\sqrt{(a^*)^2 + (b^*)^2}$.

TABLE 3

Evaluation results

|  | Particle diameter of pigment (nm) | C illuminant/ 10-degree field of view | $L^*$ | $a^*$ | $b^*$ | $c^*$ | Visual observation Shade | Clarity |
|---|---|---|---|---|---|---|---|---|
| Example 1 | about 50 | Original color paint film | 42.63 | 70.42 | −13.14 | 71.64 | Bluish | High |
|  |  | Light color paint film | 60.86 | 45.11 | −20.86 | 49.70 | Bluish | High |
| Example 2 | about 40 | Original color paint film | 42.04 | 72.02 | −13.47 | 73.27 | Bluish | High |
|  |  | Light color paint film | 60.71 | 46.38 | −20.67 | 50.78 | Bluish | High |
| Example 3 | about 70 | Original color paint film | 42.91 | 70.56 | −13.09 | 71.76 | Bluish | High |
|  |  | Light color paint film | 60.74 | 45.46 | −20.77 | 49.98 | Bluish | High |
| Comparative Example 1 | about 140 | Original color paint film | 43.68 | 70.84 | −10.58 | 71.63 | Yellowish | Low |
|  |  | Light color paint film | 61.76 | 45.55 | −18.34 | 49.10 | Yellowish | Low |
| Comparative Example 2 | about 200 | Original color paint film | 42.73 | 69.06 | −8.47 | 69.58 | Slightly yellowish | High |
|  |  | Light color paint film | 61.55 | 44.60 | −18.50 | 48.28 | Slightly yellowish | High |
| Comparative Example3 | about 50 | Original color paint film | 42.71 | 70.14 | −12.40 | 71.23 | Slightly bluish | High |
|  |  | Light color paint film | 60.98 | 45.04 | −19.53 | 49.09 | Slightly bluish | High |

The difference between Example 1 and Comparative Example 2 is only in that the drying step newly provided in the present invention does not exist in Comparative Example 2; however, as shown in Table 3, a large difference was recognized in the b* value in particular. It is indicated that as the b* value becomes smaller, the hue becomes bluisher as a result of a blue shift. It was ascertained that the solid solution pigments obtained in the other Examples also had a smaller b* value and a bluisher hue than the evaluation samples each using the solid solution pigment obtained in each Comparative Example which did not include the drying step. In addition, when comparison is made between Examples and Comparative Examples, the evaluation samples using the solid solution pigments of Examples had larger values of the chroma C*. It was ascertained that the effect is particularly large in a system of Example 2 where the quinacridone-based pigment derivative was used together in pigmentation. In addition, it was also ascertained the effect is large in the system of Example 2 in that the hue became bluish. It was also shown from the values of the chroma C* that the solid solution pigments of Examples have higher chroma C*, lower values of the brightness L*, and clearer hues than the solid solution pigments of Comparative Examples. With respect to this point, the evaluation samples using the solid solution pigments of Examples had higher clarity than the evaluation samples using the solid solution pigments of Comparative Examples in the visual observation for light color paints.

[Inkjet Ink]

<Preparation of Magenta Color Aqueous Pigment Dispersion Liquid 1>

A pre-mill base was prepared by blending 200 parts of the quinacridone solid solution pigment 1 obtained in Example 1 as a magenta pigment, 200 parts of an aqueous solution (solid content of 30%) of an ammonia-neutralized product of a styrene/2-ethylhexyl acrylate/acrylic acid (mass ratio of 50/30/20) copolymer (number average molecular weight of 7000 and acid value of 155 mgKOH/g) as a pigment dispersant, 30 parts of diethylene glycol monobutyl ether (hereinafter, abbreviated as BDG) as a liquid medium, and 340 parts of water, and deflocculating a resultant mixture with a disper. Subsequently, a dispersion treatment was performed on the obtained pre-mill base using a horizontal type media disperser "DYNO-MILL 0.6 Liter ECM TYPE" (trade name, manufactured by Shinmaru Enterprises Corporation, zirconia bead diameter of 0.3 mm) at a peripheral speed of 7 m/s. The dispersion was completed at the time when the dispersion was performed for 1 hour to obtain a mill base.

The obtained mill base was diluted with ion-exchanged water so that the pigment content was 15%, and a centrifugal separation treatment was subsequently performed to obtain a pigment dispersion liquid. The obtained pigment dispersion liquid was subjected to filtration with a 10-μm membrane filter, and ion-exchanged water, an antiseptic, and glycerin were added each in a predetermined amount to obtain a magenta color pigment dispersion liquid 1 having a pigment concentration of 12.1%.

The average particle diameter of the magenta color pigment dispersion liquid 1 obtained above was measured (25° C.) with a particle size measuring instrument "NICOMP 380ZLS-S" (manufacture by Particle Sizing Systems (PSS), LLC.) to find that the average particle diameter was 113 nm. In addition, the viscosity was 3.58 mPa·s, the surface tension was 44.9 mN/m, and the pH was 9.9. The formulation of the magenta color pigment dispersion liquid 1 and the results of the physical properties are shown together in Table 4.

<Preparation of Magenta Color Aqueous Pigment Dispersion Liquid 2>

A magenta color aqueous pigment dispersion liquid 2 was obtained in the same manner as the magenta color aqueous pigment dispersion liquid 1 except that the comparative quinacridone solid solution pigment 1 obtained in Comparative Example 1 was used in place of the quinacridone solid solution pigment 1 used in the preparation of the magenta color aqueous pigment dispersion liquid 1. The formulation of this pigment dispersion liquid 2 and the results of the physical properties are shown together in Table 4.

Next, the magenta color aqueous pigment dispersion liquid 1 obtained above was used, 5.0 parts of BDG, 2.5 parts of triethylene glycol monobutyl ether (BTG), 18 parts of glycerin, 1 part of "SURFYNOL 465" (trade name, manufactured by Air Products and Chemicals, Inc.), and water were added to 41.7 parts of the aqueous pigment dispersion liquid 1 to adjust the total amount to 100 parts, and a resultant mixture was stirred sufficiently. Thereafter, filtration was performed with a membrane filter having a pore size of 10 μm to obtain a magenta color aqueous inkjet pigment ink 1.

The particle diameter of the pigment in the obtained ink was 113 nm, the viscosity of the ink was 3.53 mPa·s, and the pH was 9.7.

The previously prepared magenta color aqueous pigment dispersion liquid 2 obtained using the comparative quinacridone solid solution pigment 1 was used, and a magenta color aqueous inkjet pigment ink 2 containing the dispersion liquid was prepared by the same method. The particle diameter of the pigment in the obtained ink was 114 nm, the viscosity of the ink was 3.53 mPa·s, and the pH was 9.7.

<Evaluation of Pigment Dispersion Liquids and Inks>
(Evaluation of Dispersion Stability/Storage Stability)

The viscosity and particle diameter of the magenta color aqueous pigment dispersion liquids 1 and 2 and the magenta color aqueous inkjet pigment inks 1 and 3 which were prepared above were measured at the initial state and after they were left to stand at 70° C. for 7 days to calculate the rate of the change in the viscosity (%) and the rate of the change in the particle diameter, and thus the dispersion stability/storage stability of the inks were evaluated. It is to be noted that any of the rates of the changes was determined from the percentage (%) of 1−(value after 7 days)/(initial value) and was evaluated according to the following criteria. The obtained results are shown in Table 5.

[Evaluation Criteria]
(Change in Particle Diameter)
Excellent: rate of change is less than ±5%
Good: rate of change is ±5% or more and less than 10%
Fair: rate of change is ±10% or more and less than 15%
Poor: rate of change is ±15% or more
(Change in Viscosity)
Excellent: viscosity is low, and rate of change is less than ±10%

TABLE 4

Formulations and physical properties of magenta color pigment dispersion liquids

| | | | Aqueous pigment dispersion liquid 1 | Aqueous pigment dispersion liquid 2 |
|---|---|---|---|---|
| Pre-mill base | Pigment used | Type | Quinacridone solid solution pigment 1 (Pigment of Example 1) | Comparative quinacridone solid solution pigment 1 (Pigment of Comparative Example 1) |
| | | Solvent for making pigment | Dimethyl sulfoxide | Water/methanol |
| | | Crystal structure | Cubic | Needle-like |
| | | Amount of use | 200 parts | 200 parts |
| | Pigment dispersant | | Styrene/2-ethylhexyl acrylate/acrylic acid copolymer (mass ratio of 50/30/20)*[1] | |
| | Amount of dispersant | | 200 parts | 200 parts |
| | BDG (in dispersant) | | 30 parts | 30 parts |
| | Water | | 340 parts | 340 parts |
| Physical properties of pigment dispersion liquid | Pigment content (%) | | 12.1 | 12.0 |
| | Average particle diameter(nm) | | 113 | 114 |
| | Viscosity (mPa · s) | | 3.58 | 3.77 |
| | Surface tension (mN/m) | | 44.9 | 44.4 |
| | pH | | 9.9 | 10.1 |

*[1]Aqueous solution of ammonia-neutralized product, number average molecular weight: 7000, acid value: 155 mgKOH/g, solid content of 30%

Good: viscosity is high, and rate of change is less than ±10%

Fair: viscosity is low, and rate of change is ±10% or more

Poor: viscosity is high, and rate of change is ±10% or more

[Measurement Conditions]

Optical density (ODvalue) on plain paper: average value of 6 points each measured 3 times Optical property (chroma C*) on plain paper: average value of 6 points each measured once

TABLE 5-1

Evaluation results of dispersion stability/storage stability of aqueous pigment dispersion liquids

| | Average particle diameter (nm) | | | | Viscosity (mPa · s) | | | |
|---|---|---|---|---|---|---|---|---|
| | Initial | After 7 days | Rate of change | Evaluation | Initial | After 7 days | Rate of change | Evaluation |
| Aqueous pigment dispersion liquid 1 (Pigment of Example 1) | 113 | 112 | −0.9% | Excellent | 3.58 | 3.48 | −2.7% | Excellent |
| Aqueous pigment dispersion liquid 2 (Pigment of Comparative Example 1) | 114 | 114 | 0.0% | Excellent | 3.77 | 3.65 | −3.3% | Excellent |

TABLE 5-2

Evaluation results of dispersion stability/storage stability of inkjet inks

| | Average particle diameter (nm) | | | | Viscosity (mPa · s) | | | |
|---|---|---|---|---|---|---|---|---|
| | Initial | After 7 days | Rate of change | Evaluation | Initial | After 7 days | Rate of change | Evaluation |
| Aqueous pigment ink 1 (Pigment of Example 1) | 113 | 114 | 0.9% | Excellent | 3.53 | 3.41 | −3.4% | Excellent |
| Aqueous pigment ink 2 (Pigment of Comparative Example 1) | 114 | 116 | 2.0% | Excellent | 3.53 | 3.42 | −3.1% | Excellent |

(Quality Evaluation of Printed Matter)

The magenta color aqueous inkjet pigment inks 1 and 2, which were prepared above, were each filled in a cartridge and printed on 2 types of paper, (i) dedicated photo glossy paper (PGPP) and (ii) plain paper (trade name "Xerox Business 4200 Paper", manufactured by Xerox Corporation, US), using an inkjet printer (trade name "PM 4000PX", manufactured by Seiko Epson Corporation.) with a photo mode to obtain printed matter. As a result, it was ascertained that any of the aqueous pigment inks can be ejected from inkjet nozzles without a problem.

The quality of the obtained printed matter was evaluated using a spectrophotometer (trade name "i1 Basic Pro", manufacture by X-Rite Inc.). Specifically, the chroma C* and the optical density (ODvalue) were measured under the following conditions and evaluated for the obtained printed matter with the spectrophotometer. The measurement results are shown in Table 6. In addition, the results of visual observation of the shade are shown together. It is to be noted that with respect to the optical density (OD value) and the chroma C*, a larger value can be rated as more excellent.

Optical density (OD value) on dedicated photo glossy paper: average value of 3 points each measured once Optical property (chroma C*) on dedicated photo glossy paper: average value of 3 points each measured once

TABLE 6

Evaluation results of quality of printed matter

| | Particle diameter of pigment in ink (nm) | Optical properties of printed matter | | | | | |
|---|---|---|---|---|---|---|---|
| | | Plain paper | | | Glossy paper | | |
| | | Chroma C* | Shade | OD value | Chroma C* | Shade | OD value |
| Aqueous pigment ink 1 | 113 | 59.5 | Bluish | 1.12 | 84.1 | Bluish | 2.12 |
| Aqueous pigment ink 2 | 114 | 58.2 | Yellowish | 1.11 | 82.0 | Yellowish | 2.04 |

From the results shown in Table 6, the printed matter obtained by printing with the magenta color aqueous inkjet pigment ink 1 to which the quinacridone solid solution pigment 1 of Example 1 was applied had more excellent color developability (OD value) and chroma (C*) in both of the cases where the magenta color aqueous inkjet pigment ink 1 was printed on the plain paper and on the glossy paper than the printed matter obtained by printing with the magenta color aqueous inkjet pigment ink 2 using the comparative quinacridone solid solution pigment 1 of Comparative Example 1, which was obtained by a conventional production method. In addition, as a result of visual observation of these pieces of printed matter, it was ascertained that the printed matter obtained by printing with the aqueous pigment ink 1 clearly has bluisher color than the printed matter obtained by printing with the aqueous pigment ink 2. From this fact, it was ascertained that the printed matter obtained by applying the quinacridone solid solution pigment obtained by the production method according to the present invention has more excellent chroma and color developability to keep the printed density at a higher level than the conventional printed matter and has an inkjet property which gives an image having a bluish hue that can satisfy the demands in the market sufficiently.

The invention claimed is:

1. A method for producing a quinacridone solid solution pigment, the method comprising:
    producing a crude quinacridone solid solution;
    drying the crude quinacridone solid solution; and
    heating the dried crude quinacridone solid solution in a solvent, thereby making the dried crude quinacridone solid solution into the quancridone solution pigment, wherein:
    in the producing the crude quinacridone solid solution, a diarylaminoterephthalic acid and a dialkylarylaminoterephthalic acid are subjected to a co-cyclization reaction in polyphosphoric acid so as to obtain a water-containing crude quinacridone solid solution comprising a solid solution of an unsubstituted quinacridone and a 2,9-dialkylquinacridone, the solid solution containing water;
    in the drying, the water-containing crude quinacridone solid solution obtained in the producing is dried to reduce a water content to less than 1% and obtain a powdery, crude quinacridone solid solution; and
    in the heating, the powdery, crude quinacridone solid solution is heated in a liquid medium that does not dissolve the crude quinacridone solid solution.

2. The method for producing a quinacridone solid solution pigment according to claim 1, wherein the diarylaminoterephthalic acid is 2,5-dianilinoterephthalic acid, and the dialkylarylaminoterephthalic acid is 2,5-di(p-toluidino)terephthalic acid.

3. The method for producing a quinacridone solid solution pigment according to claim 1, wherein a mass ratio of the unsubstituted quinacridone to the 2,9-dialkylquinacridone is in a range from 20:80 to 40:60.

4. The method for producing a quinacridone solid solution pigment according to claim 1, wherein in the heating, a quinacridone-based pigment derivative is present in the heating the powdery, crude quinacridone solid solution in the liquid medium.

5. The method for producing a quinacridone solid solution pigment according to claim 4, wherein the quinacridone-based pigment derivative is 2-phthalimidemethylquinacridone.

6. The method for producing a quinacridone solid solution pigment according to claim 1, wherein the liquid medium that does not dissolve the crude quinacridone solid solution is dimethyl sulfoxide or 1,3-dimethyl-2-imidazolidinone.

7. The method for producing a quinacridone solid solution pigment according to claim 6, wherein a heating temperature in the heating the dried crude quinacridone solid solution is in a range from 60° C. to 120° C.

8. The method for producing a quinacridone solid solution pigment according to claim 1, wherein the quinacridone solid solution pigment has a major axis diameter of particles thereof in a range from 30 to 100 nm.

9. The method for producing a quinacridone solid solution pigment according to claim 1, wherein a heating temperature in the heating the dried crude quinacridone solid solution is in a range from 20° C. to 140° C.

10. The method for producing a quinacridone solid solution pigment according to claim 1,
    wherein the quinacridone solid solution pigment has peaks at Bragg angles (2θ±0.2°) of 27.3°, 13.9°, and 5.6° in powder X-ray diffraction.

11. The method for producing a quinacridone solid solution pigment according to claim 10,
    wherein a relative intensity ratio of the peak of 27.3° is in a range of about 70 to about 80 and a relative intensity ratio of the peak of 13.9° is in a range of about 60 to about 70, relative to an intensity of the peak of 5.6° as 100.

* * * * *